United States Patent

Trojan

[11] Patent Number: 5,141,090
[45] Date of Patent: Aug. 25, 1992

[54] ELECTROMAGNETIC CLUTCH

[75] Inventor: William B. Trojan, Huntington Woods, Mich.

[73] Assignee: Ogura Corporation, Japan

[21] Appl. No.: 765,444

[22] Filed: Sep. 25, 1991

[51] Int. Cl.⁵ .................... F16D 13/75; F16D 27/10
[52] U.S. Cl. ........................... 192/84 C; 192/110 R
[58] Field of Search ............ 192/84 C, 110 R, 111 B, 192/84 B

[56] References Cited

U.S. PATENT DOCUMENTS

| | | | |
|---|---|---|---|
| 3,703,227 | 11/1972 | Murakami et al. | 192/84 C |
| 4,150,738 | 4/1979 | Sayo et al. | 192/84 C |
| 4,241,818 | 12/1980 | Miller | 192/84 C X |
| 4,449,622 | 5/1984 | Okano et al. | 192/84 C |
| 4,524,854 | 6/1985 | Miller | 192/84 C |

*Primary Examiner*—Rodney H. Bonck
*Attorney, Agent, or Firm*—Reising, Ethington, Barnard, Perry & Milton

[57] ABSTRACT

An electromagnetic clutch 10 for transmitting torque includes a field coil assembly 16, a rotor assembly 18 and an armature assembly 20. The field coil assembly 16 includes a toroidal electromagnetic coil 22. The rotor assembly includes a tubular portion 42 mounted on a bearing 36, a ring-shaped section 52 with an attraction surface 54, an outer drum-shaped flange 56 and a drive ring 60. The armature assembly 20 includes an armature hub 62, rubber stops 70, ring-shaped armature 74 and spring steel connecting members 72 connecting the armature to the armature hub. The armature hub 62 includes a central hub 64 with a bore 66 and a stopper plate 68. The bore 66 receives a splined shaft 14 and an air gap adjustment screw 88. A shaft contact surface 94 on the air gap adjustment screw 88 contacts the forward end 96 of a splined shaft 14. The position of the armature hub 62 on the splined shaft 14 and of the armature 74 relative to the attraction surface 54 is changed by rotating the air gap adjustment screw 88 relative to the central hub 64. A plate 106 locks the air gap adjustment screw 88 relative to the central hub 64. A bolt 101 secures the armature assembly 20 to the splined shaft. The armature assembly 20 can be removed from the splined shaft 14 by removing the bolt 101 and screwing a larger bolt into the threaded bore 102.

8 Claims, 2 Drawing Sheets ically,090

ELECTROMAGNETIC CLUTCH

TECHNICAL FIELD

This invention is an electromagnetic clutch which connects and disconnects a torque transmission member to a driven member by magnetizing and demagnetizing an electromagnetic coil.

BACKGROUND OF THE INVENTION

Electromagnetic clutches and brakes are used extensively in a variety of machines. They are used in stationary machines and on vehicles. Vehicle use includes use in drives for air conditioning system compressors, air compressors, superchargers, and other devices. These clutches can take many forms. Common components of the clutches include a field coil assembly, a rotor assembly and an armature assembly.

The field coil assembly is generally mounted in a fixed position. A rotor assembly is mounted adjacent to the field coil in a position to form a portion of a magnetic flux path. The rotor assembly includes a drive engaging means, such as a v-belt or power band engaging surface, a sprocket for a chain drive or a gear for a gear drive, and an attraction surface. The armature assembly includes an armature hub, an armature and connecting members which connect the armature to the armature hub. The connecting members allow the armature to move axially relative to the armature hub to engage the attraction surface on the rotor assembly and to move out of engagement with the attraction surface. The connecting members can also cushion the high peak torque that occurs when the armature contacts the attraction surface.

The armature hub has a splined bore. The bore receives a splined shaft. When the clutch is used to drive a compressor, the splined shaft is the driven shaft. The armature hub can be axially fixed on the driven shaft by a surface on the rear of the armature hub adjacent to the splined bore contacting a surface on the splined shaft at a point where the diameter of the splined shaft increases. The armature hub can also be axially fixed on the driven shaft by an inside surface of a cap partially closing the front of the splined bore through the armature hub contacting the end of the splined shaft. The hub is retained on the shaft by a bolt which screws into a threaded bore in the end of the splined shaft and holds the armature hub in an axially fixed position relative to the splined shaft.

The axial position of the armature hub on the splined shaft fixes the space between the armature and the attraction surface when the field coil is not energized. This space is referred to as the air gap. The air gap is critical. If there is no air gap the clutch is engaged when the electromagnetic coil is deenergized as well as when it is energized. If the air gap is too wide, the electromagnetic force produced by the energized field coil may be insufficient to pull the armature axially into contact with the attraction surface. The air gap is especially critical when the field coil is at an elevated temperature.

The air gap can be adjusted by placing washer-shaped spacer shims on the shaft between a surface on the rear portion of the armature hub and a portion of the splined shaft with increased diameter. The air gap can also be adjusted by placing washer-shaped shims in the splined bore in the armature hub between the end of the splined shaft and the inside surface of a cap partially closing the forward end of the splined bore. The air gap can be accurately adjusted by employing the shims described above. However, it can be time consuming to measure the air gap, remove or add washer-shaped shims as required and remeasure the air gap.

To reduce manufacturing costs, some electromagnetic clutches are assembled by machines. The electromagnetic clutch assembly machines currently used have difficulty with washer-shaped shims. The machines fail to insert a shim that is required or shims stick together and too many shims are inserted. As a result the air gap tolerance range is too broad. The broad tolerance range can potentially cause premature failure of the clutch.

SUMMARY OF THE INVENTION

An object of the invention is to provide an air gap adjustment for an electromagnetic clutch which does not include shims and optimizes the initial operating air gap.

A further object of the invention is to provide an electromagnetic clutch with a threaded member that is rotated to adjust the air gap.

The electromagnetic clutch includes a field coil assembly, a rotor assembly and an armature assembly. The field coil assembly is mounted on the housing of a driven machine and is fixed relative to the housing. The rotor assembly includes a rotor that is rotatably supported by a bearing on the driven machine housing. The rotor includes a drive belt engaging surface and an attraction surface. The rotor surrounds the field coil on three sides and forms a portion of the magnetic flux path. The attraction surface includes holes which detour the magnetic flux.

The armature assembly includes an armature hub with a central bore. The rear portion of the bore is splined and engages the splined shaft that is the drive shaft for the driven machine. The front portion of the central bore is threaded. An air gap adjustment screw with a threaded outer surface is screwed into the threaded portion of the central bore. When the air gap adjustment screw is screwed into the threaded portion of the central bore the proper distance, an axial flange engages the end of the splined shaft and sets the axial position of the armature hub on the splined shaft. A locking member locks the air gap adjustment screw preventing further rotation relative to the armature hub. The armature hub is secured to the splined shaft by a bolt that passes through a hole in the center of the air gap adjustment screw and screws into a threaded bore in the end of the splined shaft.

An armature is attached to the armature hub by connecting members which allow axial movement of the armature so that the armature can be pulled into contact with the attraction surface when the field coil is energized. When the field coil is not energized, the connecting members pull the armature out of contact with the attraction surface. The space between the attraction surface and the armature is the air gap.

The foregoing and other objects, features and advantages of the present invention will become apparent in light of the following detailed description of an exemplary embodiment thereof as illustrated in the accompanying drawing.

BEST MODE FOR CARRYING OUT THE INVENTION

Figure 1:
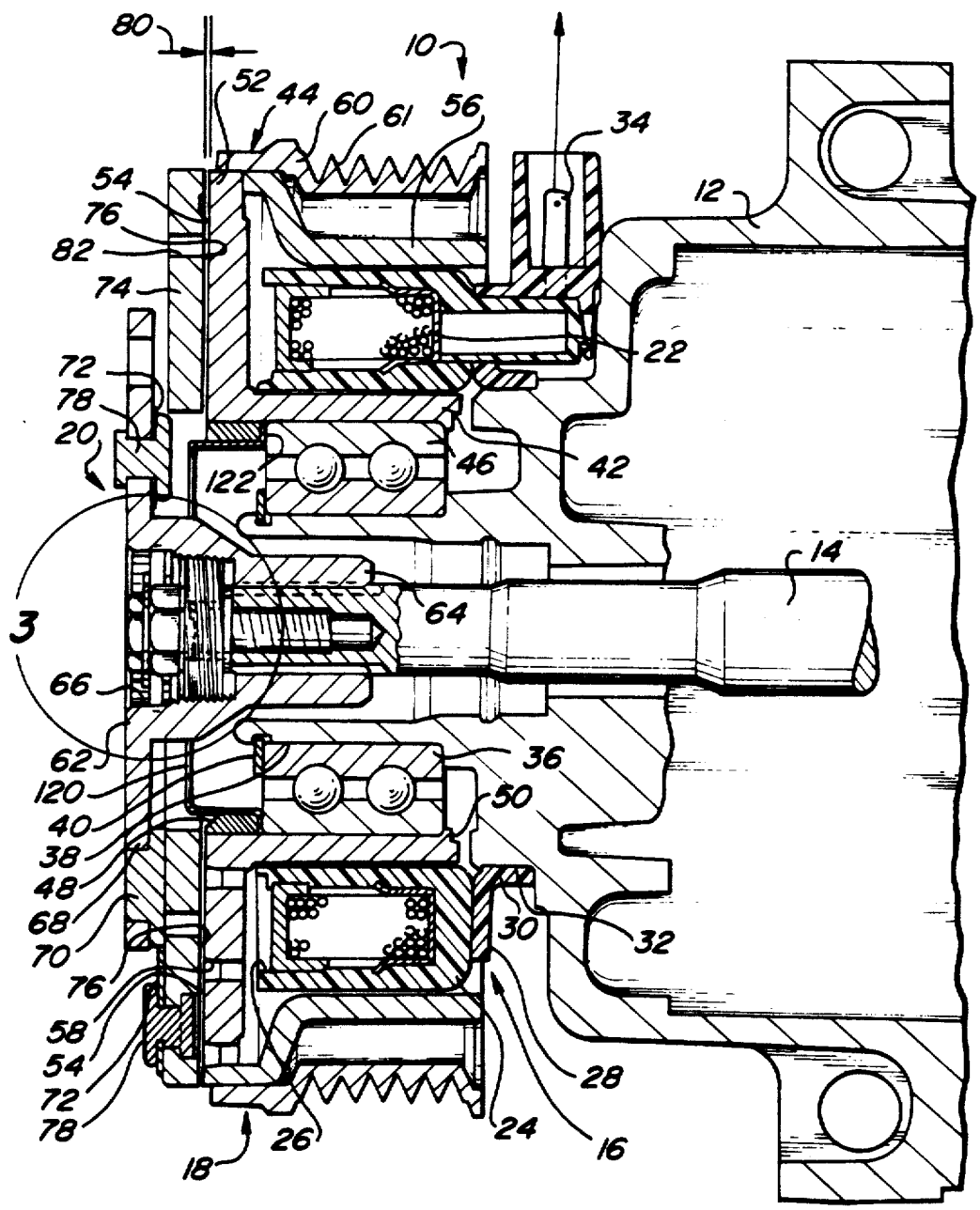
FIG. 1 is a cross-section of an electromagnetic clutch that embodies the invention.
Figure 2:
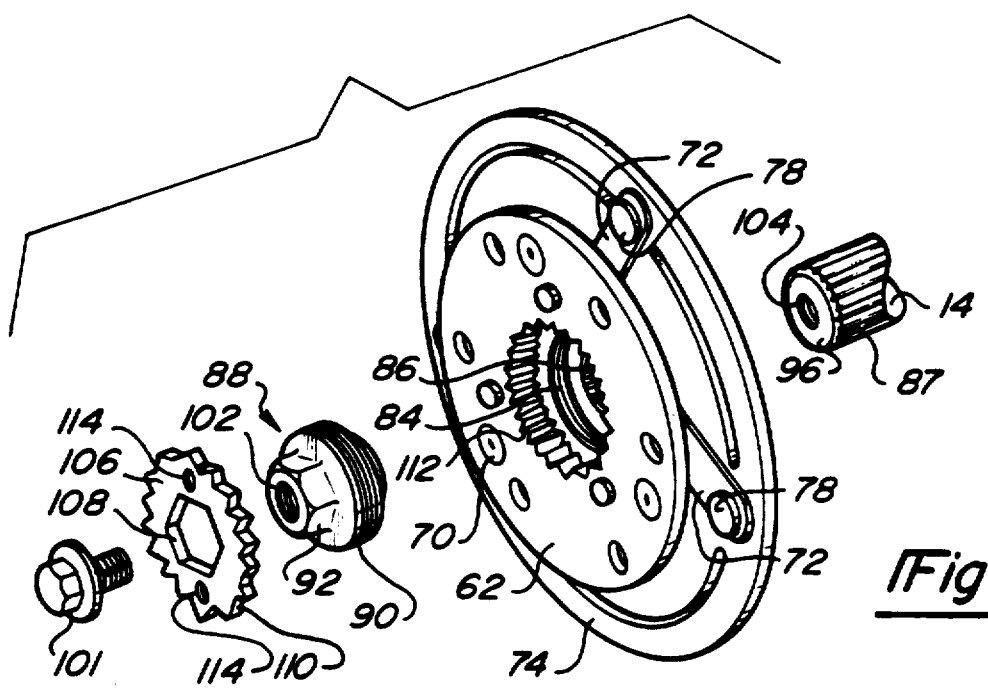
FIG. 2 is an expanded view of the air gap adjusting parts.

The electromagnetic clutch 10 is shown in FIG. 1 connected to the housing 12 and the splined shaft 14 of a compressor. The splined shaft 14 is the compressor drive shaft. The electromagnetic clutch 10 includes a field coil assembly 16, a rotor assembly 18 and an armature assembly 20.

The field coil assembly 16 includes a toroidal electromagnetic coil 22. The toroidal electromagnetic coil 22 is mounted inside a toroidal chamber in a ring member 24. The ring member 24 has a U-shaped cross-section with an open front 26. The rear of the ring member 24 is rigidly secured to a plate member 28 with a central flange 30. The flange 30 slips over cylindrical surface 32 on the housing 12 that is concentric with the splined shaft 14. The plate members 28 is secured to the housing 12 by fasteners which are not shown. An electrical connector assembly 34 is secured to the field coil 16. A wire (not shown) is connected to the electrical connector assembly 34 to carry current to the toroidal electromagnetic coil 22 in the field coil assembly 16.

The rotor assembly 18 includes a bearing 36 mounted on a drum-shaped surface 38 on the housing 12 that is concentric with the splined shaft 14. The bearing 36 is held on the drum-shaped surface 38 by a lock ring 40. A tubular portion 42 of the rotor 44 defines a rotor bore that engages an outer race 46 of the bearing 36. The bearing 36 is pressed into the rotor 44 until it is stopped by the flange 48. The tubular portion 42 is staked by a swag which forms several lips 50 to axially fix the rotor 44 on the bearing 36. A ring-shaped section 52 extends radially from the tubular portion 42. The forward surface of the ring-shaped section 52 is in a plane perpendicular to the axis of the splined shaft 14 and functions as the attraction surface 54 for the electromagnetic clutch 10. An outer drum-shaped flange 56 is secured to the ring-shaped section 52 and extends axially toward the rear. The tubular portion 42, the ring-shaped section 52 and the outer drum-shaped flange 56 surround the ring member 24 and the toroidal electromagnetic coil 22 on three sides to form a portion of a magnetic flux path. The ring-shaped section 52 of the rotor 44 includes a plurality of arcuate apertures 58 which detour the magnetic flux.

A drive ring 60 is rigidly secured to the radially outer surface of the ring-shaped section 52 and the outer drum-shaped flange 56. The drive ring 60 has a plurality of V-shaped grooves 61 which engage a power band belt that drives the rotor 44. The drive ring 60 could have a single deep V-shaped groove for a V-belt drive, a sprocket for a chain or poly-chain drive, or a gear for a gear drive. The drive ring 60 could also have a smooth surface that would engage a flat drive belt is desired.

The armature assembly 20 has an armature hub 62. The armature hub 62 includes a central hub 64 with a bore 66 and an integral radially extending stopper plate 68. The stopper plate 68 as shown is an integral part of the central hub 64. If desired, the stopper plate 68 could be a separate piece that is attached to the central hub by some common fabrication procedure. At least three rubber stops 70 are held in holes in the stopper plate 68. Three or more spring steel connecting members 72 are attached to the stopper plate 68 and to a ring-shaped armature 74 by rivets 78. The armature 74 has a contact surface 76 which is in a plane perpendicular to the axis of the splined shaft 14 and parallel to the attraction surface 54 on the rotor 44. When the electromagnetic clutch 10 is disengaged, the spring steel connecting members 72 hold the armature 74 against the rubber stops 70. When the toroidal electromagnetic coil 22 is energized by an electrical power source to engage the electromagnetic clutch 10, the spring steel connecting members 72 allow the armature 74 to move axially and into contact with the attraction surface 54. Torque is transmitted from the rotor 44 through the attraction surface 54 to the armature 74, to the spring steel connecting members 72, to the armature hub 62 and to the splined shaft 14.

The air gap 80 shown in FIG. 1 is the space between the attraction surface 54 on the rotor 44 and the contact surface 76 on the armature 74 when the electromagnetic clutch 10 is disengaged. The size of the air gap 80 is critical. If the gap is too small, the armature 74 can contact the attraction surface 54 and will tend to rotate the splined shaft 14 when the electromagnetic clutch 10 is disengaged. If the gap is too large, the toroidal electromagnetic force to move the armature 74 into contact with the attraction surface 54. The air gap 80 is especially critical when the electromagnetic coil 22 is hot. Increased resistance in the electromagnetic coil 22 at elevated temperatures decreases current and decreases the magnetic force.

The size of the air gap 80 varies depending upon the size of the clutch, the current available to energize the electromagnetic coil 22 and the design of various component parts. One typical electromagnetic clutch 10 for driving an automotive air conditioner compressor has an air gap of 0.3 to 0.6 millimeter for most efficient operation. The electromagnetic coil 22 is energized by a twelve volt electrical system. The armature 74 in this example has a plurality of arcuate apertures 82, which cooperate with the arcuate apertures 58 in the rotor 44 to form a six pole electromagnet. This specific design produces a clamping force between the armature 74 and the attraction surface 54 of up to eight hundred pounds.

The armature hub 62 has a central bore 66 which passes all the way through the central hub 64. The rear portion Of the central bore 66 has splines 86. The splines 86 cooperate with splines 87 on the forward end of the splined shaft 14 to transmit torque top the splined shaft when the electromagnetic clutch 10 is engaged. A portion of the central bore 66 forward of the splines 86 has threads 84. The threads 84 of the central bore 66 are on the walls of a section of the central bore 66 that has a larger inside diameter than the rear section of the central bore 84 with the splines 86.

Figure 3:
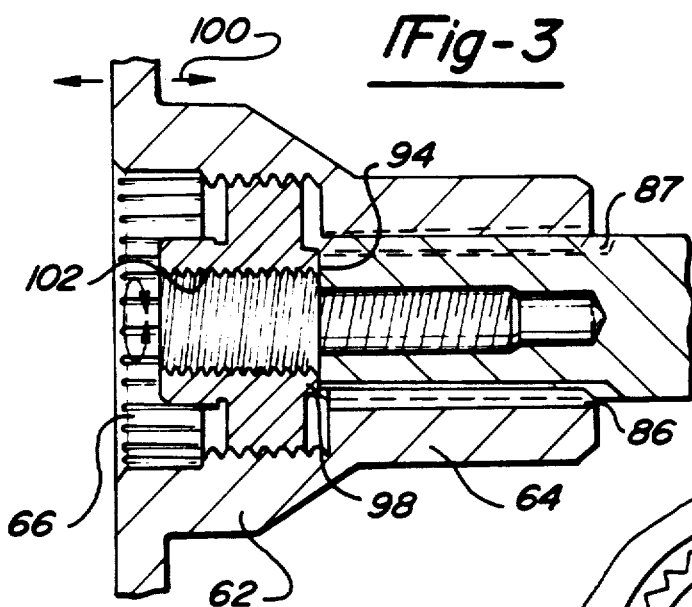
FIG. 3 is an enlarged cross-sectional view of the area 3 in FIG. 1 showing the air gap adjusting screw and associated parts.
Figure 4:
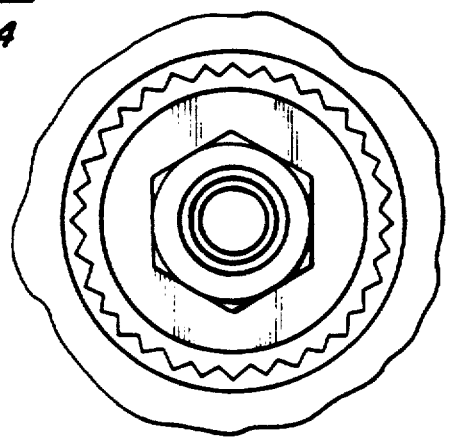
FIG. 4 is a front view of the air gap adjusting screw as shown in FIG. 3.

An air gap adjustment screw 88 with a rear threaded portion 90 and a hexagon-shaped forward portion 92 screws into the threads 84 in the central bore 66. The hexagon-shaped forward portion 92 can be engaged and turned by a standard socket tool. A shaft contact surface 94 on the rear portion of the air gap adjustment screw 88 contacts the forward end 96 of the splined shaft 14 to axially position the armature hub on the splined shaft and set the air gap 80. The shaft contact surface 94 is on a boss 98 with an outside diameter which will allow the boss to enter the portion of the central bore 66 with splines 86. Rotation of the air gap adjustment screw 88 relative to the armature hub 62 will advance or retract the air gap adjustment screw 88 in the central bore 66 and change the axial position of the armature hub 62 relative to the splined shaft 14 as indicated by the arrows 100 in FIG. 3. Rotation of the air gap adjustment screw 88 in one direction will decrease the air gap 80 and rotation in the other direction will increase the air gap.

The air gap 80 can be set by following various procedures. One procedure is to slide the armature hub 62 onto the splined shaft 14 to a point where the armature 74 is in contact with the attraction surface 54, rotate the air gap adjustment screw 88 relative to the armature hub 62 until the shaft contact surface 94 on the boss 98 contacts the forward end 96 of the splined shaft 14, and then rotate the air gap adjustment screw 88 the proper number of degrees relative to the armature hub 62 to pull the armature hub forward and create the desired air gap. Another possible procedure is to advance the air gap adjustment screw 88 into the central bore 66 a sufficient distance to provide a substantial air gap 80 when the shaft contact surface 94 is in contact with the forward end 96 of the splined shaft 14. The air gap adjustment screw 88 is then rotated in the proper direction to move it toward the front end of the central bore 66 until the air gap 80 is reduced to the desired size. When the air gap 80 is properly set, a bolt 101 is inserted through a bore 102 in the center of the air gap adjustment screw 88 and is screwed into a threaded bore 104 in the forward end of the splined shaft 14. The bolt 101 is smaller in diameter than the bore 102 through the air gap adjustment screw 88. Due to difference in diameter, the bolt 101 does not engage the threads on the inside of the bore 102.

A locking system is provided to keep the air gap adjustment screw 88 from turning relative to the armature hub 62 when the bolt 101 is tightened. The locking system can take numerous forms. It could for example be an interference fit between the threads on the rear threaded portion 90 of the air gap adjustment screw 88 and the threads 84 of the central bore 66 in the armature hub 62. A positive locking system, shown in the drawing, includes a plate 106 with a hexagon-shaped aperture 108 and a toothed outer edge 110. The hexagon-shaped forward portion 92 of the air gap adjustment screw 88 and the teeth on the toothed outer end 110 engage the teeth in the toothed forward section 112 of the central bore 66. The head of the bolt 101 holds the plate 106 in a position to prevent a change in the adjustment of the air gap 80.

A cup-shaped retainer 120 is provided to collecting leaking compressor oil or bearing grease that may migrate to the attraction surface 54 and the contact surface 76, reduce friction, and cause the electromagnetic clutch 10 to slip. The retainer 120 includes a radially projecting flange 122 that is clamped between the flange 48 and the outer race 46 of the bearing 36. The armature hub 62 passes through a central hole in the retainer 120. The retainer 120 can be rotated relative to the armature hub 62 when the electromagnetic clutch 10 is disengaged or if the clutch slips.

Two threaded passages 114 are provided in the plate 106. The plate 106 can be forced off the hexagon-shaped forward portion 92 of the air gap adjustment screw 88 by screwing bolts in the threaded passages 114.

The armature hub 62 can be removed from the splined shaft 14 by first removing the bolt 101. After the bolt 101 is removed, a larger bolt is screwed into the bore 102 which is threaded. The end of the larger bolt contacts the end 96 of the splined shaft 14 and forces the armature hub 62 off the splines 87. By leaving the plate 106 in a locking position, the armature hub 62 can be removed and then replaced on the splined shaft 14 without readjusting the air gap 80.

The splines 87 on the splined shaft 14 and the cooperating splines 86 in the bore 66 through the armature hub 62 could be replaced by equivalent structure. Keys and keyways or a hexagon-shaped shaft and a hexagon-shaped section of the bore 66 could be used for example without change to the air gap adjustment parts.

The invention has been described in detail in connection with the preferred embodiment. It will be understood by those skilled in the art that modifications can be made without departing from the scope of the invention.

I claim:

1. An electromagnetic clutch for transmitting torque for a drive member to a driven member including a hub assembly with a central hub, a bore through the central hub adapted to receive a shaft, a threaded section in the bore, an air gap adjustment screw with a threaded portion screwed into the threaded section of the bore, a shaft contact surface on the air gap adjustment screw adapted to contact said shaft and fix the axial position of the central hub relative to said shaft, securing means for securing the hub assembly to said shaft wherein the air gap adjustment screw includes a threaded bore adapted to receive a bolt that can contact the axial end surface of said shaft and force said shaft from the bore in the central hub.

2. The electromagnetic clutch of claim 1 including a locking means for preventing rotation of the air gap adjustment screw relative to the central hub.

3. An electromagnetic clutch as set forth in claim 2 wherein the locking means is a plate with a surface that engages the air gap adjustment screw and at least one outer edge tooth that engages teeth in the central bore in the central hub.

4. The electromagnetic clutch of claim 1 wherein the shaft contact surface on the air gap adjustment screw is adapted to contact the axial end surface of said shaft.

5. An electromagnetic clutch including a field coil assembly; a rotor assembly rotatable about a fixed axis and having an attraction surface on the rotor assembly that is in a plane perpendicular to the fixed axis; and an armature assembly adapted to be mounted on a shaft that is rotatable about the fixed axis, including a hub assembly with a central hub, an armature connected to the hub assembly and axially movable along the fixed axis relative to the central hub, a bore through the central hub which is concentric with the fixed axis, screw threads in the front portion of the bore through the central hub and wherein the rear portion of the bore is adapted to receive an end of said shaft, an air gap adjustment screw with a shaft contact surface screwed into the screw threads in a portion of the bore through the central hub until the air gap adjustment screw is in a position in which the shaft contact surface is engageable with said shaft to fix the axial position of the central hub relative to said shaft and thereby set the maximum space between the armature and the attraction surface on the rotor, a lock member inserted in the front portion of the central bore through the central hub and in engagement with the air gap adjustment screw and the central hub to prevent rotation of the air gap adjustment screw in either direction after the air gap adjustment screw is set in the desired position within the bore through the central hub, and a fastener for securing the hub assembly to said shaft.

6. The electromagnetic clutch of claim 5 wherein the air gap adjustment screw includes a threaded bore adapted to receive a bolt that can contact the axial end surface of said shaft and force said shaft from the bore in the central hub.

7. An electromagnetic clutch as set forth in claim 5 wherein the lock member is a plate with a surface that engages the air gap adjustment screw and at least one outer edge tooth that engages teeth in the central bore in the central hub.

8. An electromagnetic clutch as set forth in claim 7 wherein the air gap adjustment screw includes a threaded bore adapted to receive a bolt that can contact the axial end surface of said shaft and force said shaft from the bore in the central hub.

* * * * *

UNITED STATES PATENT AND TRADEMARK OFFICE
CERTIFICATE OF CORRECTION

PATENT NO. : 5,141,090
DATED : August 25, 1992
INVENTOR(S) : William B. Trojan

It is certified that error appears in the above-identified patent and that said Letters Patent is hereby corrected as shown below:

Column 4, line 28, after "electromagnetic" insert -- coil 22 will not create sufficient magnetic --.

Column 4, line 51, delete "top" and insert -- to --.

Column 6, line 21, delete "for" and insert -- from --.

Signed and Sealed this

Eighth Day of November, 1994

Attest:

BRUCE LEHMAN

Attesting Officer

Commissioner of Patents and Trademarks